United States Patent [19]

Farrell

[11] 3,944,645

[45] Mar. 16, 1976

[54] METHOD FOR BALLOON BLOWN PLASTIC MOLDING

[75] Inventor: John J. Farrell, Green Brook, N.J.

[73] Assignee: Farrell Patent Company, Greenbrook, N.J.

[22] Filed: Mar. 18, 1974

[21] Appl. No.: 452,426

Related U.S. Application Data

[62] Division of Ser. No. 246,878, April 24, 1972, Pat. No. 3,816,046.

[52] U.S. Cl. .................. 264/237; 264/90; 264/97; 264/314; 264/335; 264/DIG. 78
[51] Int. Cl.² B29C 17/06; B29C 17/07; B29C 25/00
[58] Field of Search ............ 264/89, 90, 92, 94, 97, 264/314, 335, DIG. 78, 237, 348; 425/242 B, 387 B, 389, DIG. 208, 209, 211, 213, 214

[56] References Cited
UNITED STATES PATENTS

| | | | |
|---|---|---|---|
| 720,718 | 2/1903 | Maddock et al. | 425/DIG. 14 |
| 2,331,702 | 10/1943 | Kopitke | 264/97 |
| 2,410,936 | 11/1946 | Gronemeyer et al. | 264/314 X |
| 2,644,198 | 7/1953 | Crawford | 264/335 X |
| 2,792,593 | 5/1957 | Hardgrove, Jr. | 264/94 X |
| 3,032,823 | 5/1962 | Sherman | 264/314 X |
| 3,337,666 | 8/1967 | Wilkins | 425/DIG. 209 |
| 3,470,282 | 9/1969 | Scalora | 264/97 |
| 3,607,998 | 9/1971 | Goodridge | 264/314 X |
| 3,707,591 | 12/1972 | Chalfant | 425/242 B X |

*Primary Examiner*—Jan H. Silbaugh
*Attorney, Agent, or Firm*—Marvin Feldman

[57] ABSTRACT

This invention is a method of making blown plastic articles on an injection blow molding machine with an expandable balloon that covers the core rods and over which a parison is applied at an injection mold station. The parison can be blown at lower temperatures for better orientation; and the balloon permits circulation of cooling fluid, including liquid, to cool the blown article from the inside while contact with the blow mold cavity cools the blown article from the outside.

10 Claims, 8 Drawing Figures

METHOD FOR BALLOON BLOWN PLASTIC MOLDING

RELATED PATENT

This application is a division of my copending application Ser. No. 246.878, filed Apr. 24, 1972, now U.S. Pat. No. 3,816,046.

BACKGROUND AND SUMMARY OF THE INVENTION

In injection molding machines the core pin is first inserted into the mold cavity of an injection mold where the surfaces of the cavity are spaced from the subsurfaces of the core pin by a distance equal to the desired thickness of plastic coating which is to be applied to the core pin. The plastic material is then injected into the mold cavity and the core pin thus coated with the material.

The mold is then opened and the core pin is transferred to a blowing mold where the cavity has the shape of the product which is to be blown. Blowing fluid under pressure is then discharged from the core pin against the plastic that surrounds the core pin and the plastic is blown outwardly away from the core pin and into contact with the sides of the mold. After a short cooling time, the blowing mold is opened and the core pin is moved to a stripping station where the blown article is stripped from the core pin.

In extrusion molding machines, a plastic tube is extruded downwardly into an open blowing mold and a core pin extends from the extruder downwardly along the axis of the tube. When the tube has reached a length greater than the length of the blowing mold, the mold closes and pinches the bottom of the tube closed while clamping the upper end of the tube tightly around the core pin. The tube is then blown to the shape of the mold cavity by blowing fluid discharged from the core pin and the mold is opened to permit the extrusion of another length of tubing. The blown molding is cut off from the tube and the mold closes on the new length of tube to repeat the blowing step.

In both types of machines, the molding must remain in the blowing mold until the plastic cools sufficiently to hold its shape. The blowing mold is cooled by circulation of water or other cooling fluid through cooling passages in the wall of the mold.

The pressure of air or other fluid used to blow the plastic must be limited in pressure. If introduced into the blowing mold at too high pressure, the blowing fluid will blow out the plastic wall at the weakest place or location of greatest stress, and the temperature of the plastic must be controlled so that the plastic is hot enough to blow at the pressure that can be safely used.

By covering the core rod with a balloon and coating the outside of the balloon with the plastic to be blown, a number of new results are obtained. One is that higher pressure can be used to blow the molding. The balloon prevents the blowing fluid from having contact with the plastic and there is no danger of a blowout of the plastic. Because higher pressure can be used for blowing, plastic can be blown at lower temperature and after it has been cooled to the temperature range at which it begins to crystallize. This permits orientation of the molecules and by having a balloon that is deformed biaxially, the plastic of the molding is stretched both circumferentially and axially (or in other directions at right angles to one another) so that the molding has biaxial orientation with resulting greater strength, and in the case of some plastics, clear transparency.

Another new result is obtained if the balloon is made with different wall thickness at different sections of its extent. There is then a sequential expansion of the different sections of the balloon so that corresponding sections of the parison are blown at different times. For example, the upper or lower portion of the molding might be blown ahead of another portion.

Blowing fluid, such as liquid, at temperatures substantially lower than the plastic can be used and circulated through the balloon during the blowing operation and immediately thereafter so that the molding is cooled from both the inside and outside to obtain substantially faster cooling and a shorter cycle for the machine, and increased production.

The invention is suitable for use on either injection blow molding machines or extrusion blow molding machines.

Other objects, features, and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
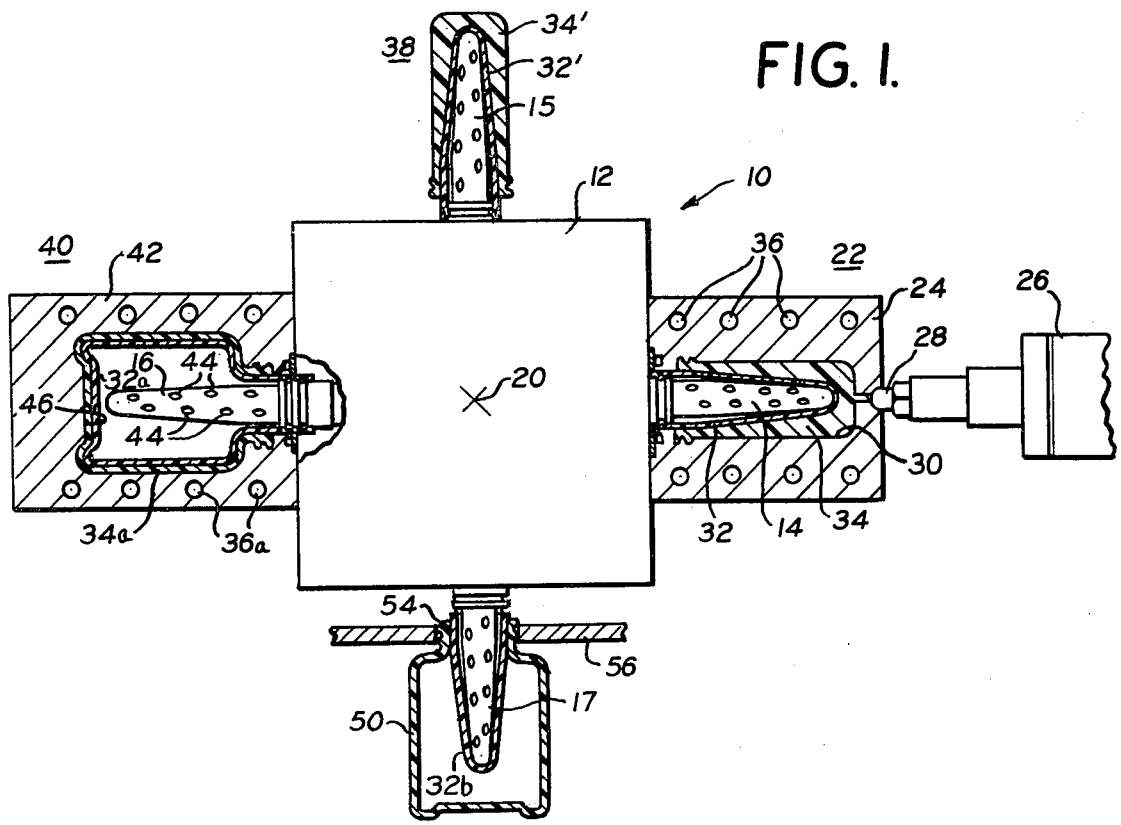
FIG. 1 is a diagrammatic view of an injection blow molding machine with the molds, plastic, and balloon covered core pin shown in section.

FIG. 1 shows an ijection blow molding machine 10 which includes a turret 12 with four core pins, 14, 15, 16 and 17 projecting from different sides of the turret 12 at 90° angular relation to one another. The turret 12 is rotated about an axis 20 wherever the core pins 14–17 are to be transferred from one station to another.

The first station of the machine 10 is an injection station 22 which has a mold 24 to which plastic is supplied from an extruder 26 through a nozzle 28. The core pin 14 extends into a cavity 30 of the mold 24.

Figure 4:
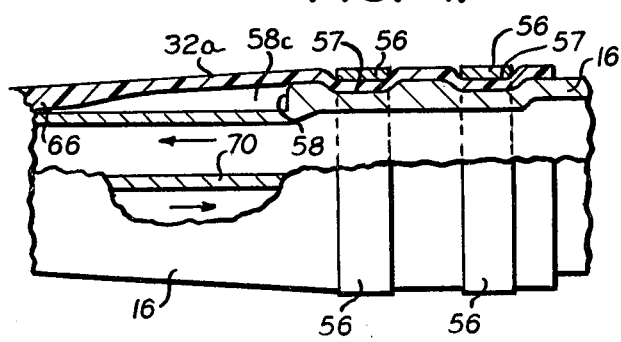
FIG. 4 is a greatly enlarged fragmentary view of a portion of the core pin shown in FIG. 2.
Figure 3:
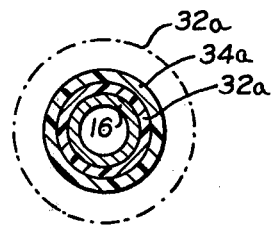
FIG. 3 is a sectional view taken on the line 3—3 of FIG. 2.

The core pin 14 is covered by a balloon 32 which is secured to the core pin in a manner which will be explained in connection with FIGS. 2 and 4. The core pin 14 with the balloon 32 covering it, extends into the cavity 30. With the mold 24 closed, plastic 34 is injected into the cavity 30 so as to coat the entire portion of the balloon 32 which is spaced from the surface of the mold cavity 30.

The injection mold 24 is of conventional construction with passages 36 for the circulation of cooling fluid; and the mold 24 opens to release the plastic 34. The mold opens wide enough so that the turret 12 can rotate and move the core pin 14, balloon 32 and plastic 34 in a counterclockwise direction about the center 20 into the position occupied by the core pin 15 in FIG. 1.

During this movement of the turret 12 through an angle of 90°, the core pin 15 is moved into the position occupied by the core pin 16 in FIG. 1 and the core pin 16 is moved into the position occupied by the core pin 17. The core pin 17 moves into the open mold 24 where it is ready to receive a charge of plastic 34 from the nozzle 28 at the beginning of the next cycle of the machine. The operation of the mold 24 in opening and closing; and the operation of the turret 12 in transferring core pins from one station to another are well understood in the injection blow molding machine art and no further illustration or description of this structure is necessary for a complete understanding of this invention.

The second station of the machine 10 is a conditioning station 38. The core pin 15 at the conditioning station 38 has a balloon 32' covered with plastic 34' which was applied to the core pin 15 in the mold 24 in the manner already described for the core pin 14. Each core pin 15 with its plastic 34' remains at the conditioning station 38 until the next movement of the turret 12, and during this time the plastic 34' cools to substantially the temperature desired for blowing. This cooling time is determined by the dwell period of the turret 12; but the amount of cooling desired will vary with the amount of plastic 34' which is applied at different times depending upon the molds which are on the machine for producing a particular molding. The amount of cooling also depends on the temperature at which the blowing is to be performed. This in turn depends upon the pressure that is to be used and upon the amount of orientation of the molecules that are required or desired for a particular molding. Although the dwell time at the conditioning station 38 is not variable to suit the desired cooling, the extent of cooling can be controlled at the dwell station by controlling the temperature of the atmosphere surrounding the plastic 34' or by subjecting the plastic to radiant heating of various degrees while at the conditioning station 38.

The machine can have a blowing station 40 at which there is a blowing mold 42 into which the core pin 16 is travelled during the preceding movement of the turret 12 and while the mold 42 was open. When the mold 42 is closed, and blowing fluid is discharged from openings 44 in the core pin 16, a balloon 32a on the core pin 16 expands and moves plastic 34a into contact with the surfaces of a mold cavity 46 of the mold 42. FIG. 1 shows the balloon 32a expanded and the plastic 34a shaped to the contour of the mold cavity 46.

The mold 42 has passages 36a for cooling fluid and it is necessary for the 11 plastic 34a to cool in the mold 42 to a temperature low enough to make the plastic self-sustaining before the article molded from the plastic can be removed from the mold 42. This time required for the molded article to cool has been the limiting factor on the output of injection molding machines. With the present invention, the balloon 32a can be inflated with water or other liquid at a temperature which will cool the plastic 34a from the inside at the same time that contact with the walls of the mold 42 cool the plastic from the outside. By cooling the plastic from both sides, the cooling time can be greatly reduced. This shortens the cycle of the molding machine and greatly increases the production.

When the article molded from the plastic 34a, which is shown in FIG. 1 as a bottle 50, has cooled to a shape sustaining temperature, the mold 42 is opened and the turret 12 rotates another 90° to move the core pin to a stripping station 52 where the core pin 17 is shown with a bottle 50 held on the core pin by the neck 54 of the bottle. The core pin 17 has a balloon 32b which is shown deflated in FIG. 1, the deflation having taken place upon completion of the cooling at the blowing station 40 and while the core pin was travelling from the blowing station to the stripping station 52. At the stripping station 52 a stripper plate 56 moves into engagement with the neck 54 of the bottle and pushes the bottle axially along the core 17 to disengage the bottle from the core pin. This completes the manufacture of the bottle 50 on the molding machine.

Figure 2:
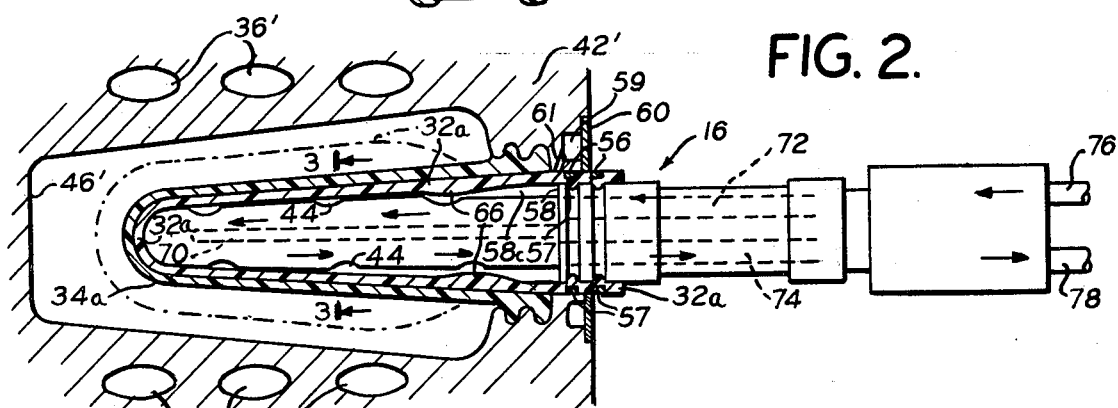
FIG. 2 is a greatly enlarged sectional view of a blowing mold with a differently shaped cavity from that shown in FIG. 1 and with the plastic on the core pin not yet blown.

FIG. 2 shows the core pin 16 in a mold 42' which is similar to the mold 42 of FIG. 1 except that the mold cavity 46' is of different shape and the passages 36' for cooling the mold are also of different shape. The balloon 32a is secured to the core pin 16 by clamping rings 56 which clamp the material of the balloon 32a into circumferential grooves 57 extending around the outside surface of the core pin 16. Two rings 56 are shown; one outside the mold 42' and the other inside. The mold 42' closes firmly against the outside surface of the balloon 32a so that none of the plastic material 34a can be extruded from the mold cavity between the balloon and the clamping surace of the mold 42' which clamps against the surface of the balloon 32a.

There is a shoulder 58 on the core pin 16 and there is a clearance 58c between the core pin and the inside surface of the balloon 32a for some distance to the left of the shoulder 58 in FIG. 2. This clearance is maintained, during injection of the plastic into the mold at the injection station 22 (FIG. 1) by supplying fluid within the balloon 32a substantially equal to the pressure at which the plastic is injected into the mold.

A circumferential air manifold 59 extends around one end of the mold 42' and the side of the manifold is closed by a cover 60. Passages 61, at angularly spaced locations around the mold, lead from the air manifold 59 to the outside surface of the balloon 32a at regions where the balloon 32a can collapse toward the core pin; i.e., at the region of the balloon surface outside of clearance space 58c.

Plastic is prevented from entering the passage 61, at the injecton station, by maintaining enough pressure within the balloon to prevent the plastic from collapsing the balloon into the clearance 58c. Less counterbalancing pressure in the balloon is required when each passage 61 is located near the end of the clearance 58 as shown in FIG. 2.

When the blowing operation is complete, and the blown article has cooled enough to hold its shape, a partial vacuum is drawn on the core pin 16 to collapse the balloon. The balloon cannot collapse unless air can gain entrance between the outside surface of the balloon and the inside surface of the blown article. The balloon 32a collapses into the clearance 58 when the vacuum is first drawn on the core pin. This opens a clearance between the balloon and the inside surface of the neck of the blown bottle. Air from the passages 61 rushes into this clearance between the balloon and the blown bottle for the length of the balloon that did not expand during the blowing operation. Beyond this the expanded balloon collapses away from the blown bottle as air continues to flow toward the left in FIG. 2 along the outside surface of the balloon.

FIG. 2 shows the feature of blowing different parts of the parison sequentially. In order to obtain expansion of some parts of the balloon 32a ahead of other parts, the walls of the balloon 32a are thicker around the region 66 than at other parts of the length of the balloon. Thus when the balloon 32a is inflated, as indicated by the broken lines in FIG. 2, the part of the balloon to the left of the region 66 expands before the wall at the region 66 expands. By controlling the stiffness or elasticity of the walls of the balloon 32a at different regions, the plastic 34a can be blown sequentially as to different portions of its length.

In FIG. 2, for example, the expansion of the balloon from the dotted line position shown in FIG. 2 will soon bring the plastic into contact with the side of the mold cavity at a region midway between the right and left hand ends of the cavity. Further expansion of the balloon will stretch the plastic in both directions from this mid region as the left hand end of the balloon travels toward the left hand end of the mold cavity and as the stiffer right hand portion of the balloon expands toward the right hand end of the mold cavity. Thus the plastic is stretched both circumferentially, with the increase in diameter of the balloon, and also axially to produce a biaxial orientation of the plastic material if the plastic material is blown at a temperature low enough to permit orientation of the molecules. Since the balloon prevents the blowing fluid from having contact with the plastic 34a, the blowing fluid can be at extremely high pressure without danger of breaking through a weak portion of the plastic and the blowing at higher pressure permits the plastic material 34a to be blown at lower temperature at which it has begun to crystallize.

Figure 5:
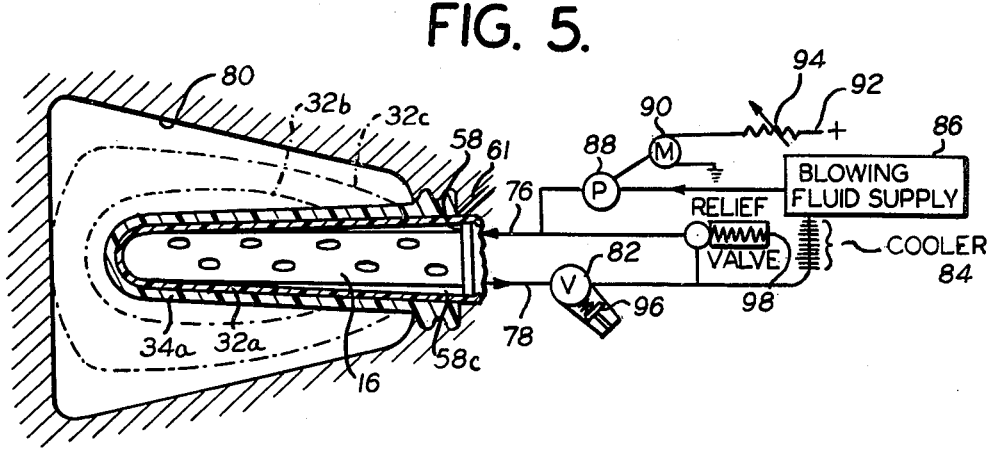
FIG. 5 is a view showing diagrammatically a closed circuit connected with the core pin of FIG. 2 for supplying cooling and blowing fluid to the core pin.

The proportion of the core pin 16 which extends into the cavity of the mold has a center partition 70 extending lengthwise of the core pin as shown in dotted lines in FIG. 2. Water or other blowing and cooling fluid flows into the space on one side of the partition 70 through an inlet passage 72 and flows out of the space on the other side of the partition 70 through an exhaust passage 74. These passages communicate with tubing 76 and 78, respectively, which are part of a closed circuit as will be explained in connection with FIG. 5. Thus the fluid supplied to the passage 72 flows out through the openings 44 on one side of the core pin and circulates generally circumferentially around the core pin within the inflating balloon 32a; and this liquid or other fluid returns to the interior of the core pin on the other side of the partition 70 through the opening 44 that are on that side of the partition. The blowing and cooling fluid then passes out through the exhaust passage 74, as already explained. FIG. 5 shows the core pin 16 in a mold cavity 80 which tapers to a larger diameter at the far end of the mold instead of to a smaller diameter as shown in FIG. 2. This difference depends upon the desired shape of the particle which is being blown. As in the other molds, the core pin 16 is shorter than the mold so that the plastic being blown is stretched axially as well as well as circumferentially. FIG. 5 shows in dotted lines indicated by the reference characters 32b and 32c the contour of the balloon as it expands in the mold cavity 80 with differences in the localized expansion as the result of greater resistance to expansion toward the right hand end of the balloon.

FIG. 5 also shows diagrammatically the closed circuit through which blowing fluid from the exhaust tube 78 travels through a valve 82 and cooler 84 to a blowing fluid supply tank 86 from which the blowing fluid is fed back by a pump 88 to the supply tube 76.

The pump 88 is driven by a motor 90 connected with a power supply line 92 and having a speed control 94 for regulating the rate of supply of blowing fluid to the core pin. No attempt is made to show the automatic control for instigating and stopping the flow of blowing fluid in accordance with the cycle of the blow molding machine since this is conventional. The use of the blowing fluid to supply cooling to the inside of the molded article is one of the novel features of this invention. The valve 82 is shown with spring loading 96 which is adjustable to change the back pressure in the core pin and this valve 82 is adjusted to make the back pressure as high as desirable in order to obtain the necessary blowing pressure. A relief valve 98 is interposed in the closed system to permit discharge from the pump 88 to flow back to the blowing fluid supply tank 86 through a by-pass around the valve 82.

The cooler 84 is shown as a tube with heat radiating pins, but this is merely representative of means for cooling fluid passing through the tubing and any other cooling expedient can be used depending upon the amount of heat to be dissipated.

Figure 6:
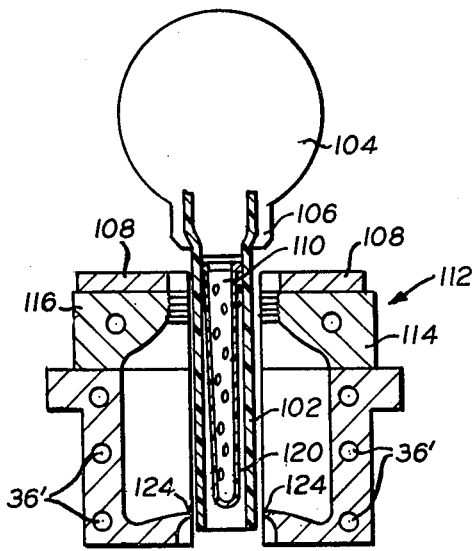
FIG. 6 is a diagrammatic view of an injection blow molding machine with a balloon covered core pin made in accordance with this invention.
Figure 7:
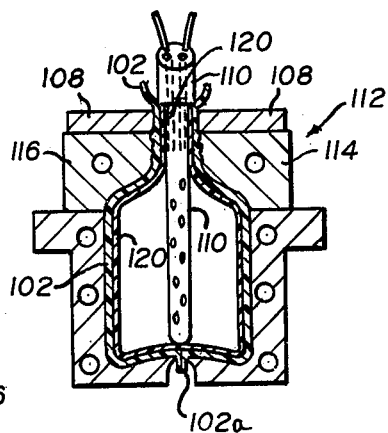
FIG. 7 is a view similar to FIG. 6 but showing the blowing mold in closed position and the condition of the plastic and balloon at the end of the blowing operation.

FIGS. 6 and 7 show the application of the invention to an extrusion molding machine. A plastic pipe 102 is extruded downwardly from an extruder 104 through an extruder die 106 located above clamping jaws 108. A core pin 110 extends downward from the extruder 104 and this core pin 110 is located within the extruded tube 102 and substantially concentric therewith.

A blowing mold 112 is made up of two mold sections 114 and 116 which are shown separated in FIG. 6 and closed together in FIG. 7. The core pin 110 is covered with a balloon 120 in the same way as the core pins described in FIGS. 1–5.

When the tube 102 has been extruded to a length sufficient to reach the bottom of the mold cavity of the mold 112, the jaws 108 are brought together by clamping forces to pinch the tube 102 tight around the outside surface of the balloon 120 as shown in FIG. 7; and the mold sections 114 and 116 are then brought together so that bottom edges 124 pinch the lower end of the tube 102 tightly closed with a lower tail end of the tube projecting below the edges 124 as indicated by the reference character 102a in FIG. 7.

Blowing fluid is then supplied to the core pin 110 and the balloon 120 is expanded to force the tube 102 outward into contact with the surfaces of the mold cavity formed by the closed sections 114 and 116.

When the plastic is fully blown in the mold 112, the mold cools the plastic to a shape-sustaining temperature and the mold is then opened, the balloon collapsed, and the molded bottle removed from the core pin.

Figure 8:
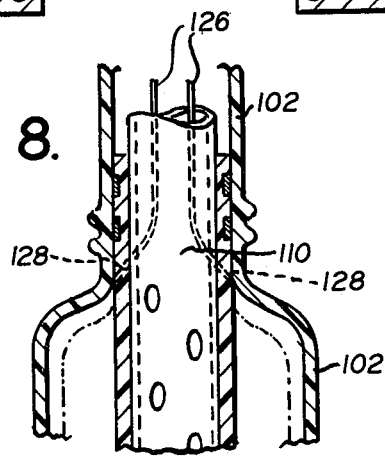
FIG. 8 is an enlarged, fragmentary, detail view of vents for the core pin of FIGS. 6 and 7.

FIG. 8 shows the core pin 110 with vent tubes 126 opening through holes 128 in the sides of the core pin 110 and through the sides of the balloon 120 for admitting air between the outside of the balloon and the inside of the blown article for collapse of the balloon.

Vent openings for permitting escape of air from molds as the plastic is blown, and for admitting air to break vacuums when articles are to be removed from the molds are provided by using openings or channels of small crosssection that does not permit entrance of plastic into the opening. Such vents are well-known and used in conventional blow molding apparatus and a description of the vents is not necessary for a complete understanding of this invention.

The prefered embodiments of the invention have been illustrated and described, but changes and modifications can be made and some features can be used in different combinations without departing from the invention as defined in the claims.

What is claimed is:

1. A method for injection blow molding a biaxially oriented hollow plastic article comprising:

providing a core rod with a deflated balloon surrounding the core rod, and maintaining a fluid tight seal between the core rod and balloon adjacent the neck portion of the parison, injection molding plastic material onto the exterior surface of the balloon to form a parison; conditioning the parison to a temperature low enough to permit orientation; inflating the core rod supported balloon in a blow mold so as to stretch the parison both circumfrentially and axially to take the shape of the blow mold so as to form a biaxially oriented article; providing a clearance between the expanded balloon and the core rod adjacent the neck portion of the blown article for permitting the balloon to collapse; and collapsing the balloon by drawing vacuum on the balloon through the core rod to provide a clearance between the balloon and the inside surface of the blown article, and permitting air to enter this clearance so as to collapse the balloon.

2. The method of claim 1, providing fluid under pressure to the inside of the balloon during injection molding to maintain said clearance between the core rod and inside surface of the balloon, and wherein the fluid pressure inside the balloon during injection molding is substantially the pressure at which the plastic is injection molded.

3. The method of claim 1, wherein the blown article is a bottle having a neck portion and wherein the neck portion is formed during injection molding, and the inside of said neck portion contacting the balloon.

4. The method of claim 3, wherein the neck portion remains confined in the blow mold without radial expansion of that portion of the balloon about which the neck has been formed.

5. The method of claim 4, wherein collapsing the balloon, the fluid is air, and said air is permitted to flow between the inside of the neck portion of the container and the outside of the balloon.

6. The method of blow molding described in claim 1 characterized by coating molten plastic molding material on a balloon made of elastomeric material that retains its elastomeric qualities, including memory, at the blowing temperature of the molten plastic molding material.

7. The method of blow molding described in claim 6 characterized by applying the molding material to the balloon in a liquid state, delaying the inflating of the balloon until after the molding material has begun to harden, and then stretching the molded material by inflating the balloon.

8. The method of blow molding described in claim 1 characterized by inflating the balloon in a blowing mold cavity, cooling the blowing mold by the circulation of cooling fluid through passages in the walls that form the cavity of the mold, and cooling the molding material from the inside thereof by circulating cooling fluid into and out of the balloon while inflating the balloon with said cooling fluid.

9. The method of blow molding described in claim 1 characterized by cooling the mold by the circulation of cooling fluid through passages in the walls that form the cavity of the mold, and cooling the mold material from the inside thereof by inflating the balloon with a liquid that is at a substantially lower temperature than the molding material.

10. The method of blow molding described in claim 1 characterized by circulating cooling fluid into the core rod, from localized regions of the core rod, into the balloon, and from the balloon into the core rod at other localized regions of the core rod, and then out through an exhaust passage of the core rod.

* * * * *